United States Patent
Okubo et al.

(10) Patent No.: US 10,353,660 B2
(45) Date of Patent: Jul. 16, 2019

(54) IMAGE DISPLAY SYSTEM

(71) Applicant: Panasonic Intellectual Property Management Co., Ltd., Osaka (JP)

(72) Inventors: Ryoji Okubo, Osaka (JP); Ken Mashitani, Osaka (JP); Masaru Sekizawa, Osaka (JP); Takaaki Abe, Osaka (JP); Kazuma Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/701,922

(22) Filed: Sep. 12, 2017

(65) Prior Publication Data

US 2018/0074778 A1    Mar. 15, 2018

(30) Foreign Application Priority Data

Sep. 15, 2016 (JP) ................. 2016-180675
Jun. 26, 2017 (JP) ................. 2017-124319

(51) Int. Cl.
*G06F 3/14* (2006.01)
*G06T 7/70* (2017.01)
*G09G 5/14* (2006.01)

(52) U.S. Cl.
CPC .......... *G06F 3/1446* (2013.01); *G06F 3/1415* (2013.01); *G06T 7/70* (2017.01);
(Continued)

(58) Field of Classification Search
CPC .... G06F 3/1446; G06F 3/1415; G06F 3/0482; G06F 3/0484; G06F 3/04842; G06T 7/70;
(Continued)

(56) References Cited

U.S. PATENT DOCUMENTS

| 8,872,924 B1 * | 10/2014 | Lin ....................... G06F 3/1446 348/181 |
| 2009/0073080 A1 * | 3/2009 | Meersman .......... G02F 1/13336 345/1.3 |

(Continued)

FOREIGN PATENT DOCUMENTS

| JP | 2008-281717 | 11/2008 |
| JP | 2008-281718 | 11/2008 |

(Continued)

*Primary Examiner* — Tom V Sheng
(74) *Attorney, Agent, or Firm* — Wenderoth, Lind & Ponack, L.L.P.

(57) ABSTRACT

Image display system 10 comprises: a plurality of display devices 111; an image processing unit for receiving input of a plurality of input video signals and generating an output video signal for each display device in accordance with a layout for the display devices from the input video signals; a pattern signal generation unit for generating pattern signals indicating a plurality of different test pattern images; a selector for receiving input of the output video signals and the pattern signals and selecting and outputting either the output video signals or the pattern signals; imaging device 120 for capturing an image of the test pattern images displayed on the respective display devices; and a control device 140 for analyzing the captured image captured by the imaging device and generating control information for controlling the image processing unit, based on analysis results.

7 Claims, 12 Drawing Sheets

(52) U.S. Cl.
CPC ...... *G06T 2207/10016* (2013.01); *G09G 5/14* (2013.01); *G09G 2300/026* (2013.01); *G09G 2330/12* (2013.01); *G09G 2356/00* (2013.01); *G09G 2360/04* (2013.01); *G09G 2360/145* (2013.01); *G09G 2370/20* (2013.01)

(58) Field of Classification Search
CPC ............ G06T 2207/10016; G09G 5/14; G09G 2300/026; G09G 2330/12; G09G 2356/00; G09G 2360/04; G09G 2360/145; G09G 2370/20
See application file for complete search history.

(56) References Cited

U.S. PATENT DOCUMENTS

| | | | |
|---|---|---|---|
| 2011/0102300 A1* | 5/2011 | Wood | H04N 9/3147 345/1.3 |
| 2012/0147200 A1 | 6/2012 | Watanabe et al. | |
| 2015/0279037 A1* | 10/2015 | Griffin | G06F 3/1446 345/1.3 |
| 2016/0139867 A1* | 5/2016 | Cha | G06F 3/1423 348/383 |
| 2016/0224209 A1* | 8/2016 | Takeda | G06F 3/04817 |
| 2016/0231975 A1* | 8/2016 | Kim | G06F 3/1446 |

FOREIGN PATENT DOCUMENTS

| | | |
|---|---|---|
| JP | 2013-106132 | 5/2013 |
| JP | 2013-153410 | 8/2013 |
| JP | 5724346 | 5/2015 |

* cited by examiner

FIG. 7

■Display arrangement information  50

| Display no. | X coordinate | Y coordinate | Rotation angle |
|---|---|---|---|
| 1 | 100 | 550 | 0° |
| 2 | 100 | 1630 | 0° |
| 3 | 2020 | 1090 | 0° |
| 4 | 2020 | 10 |  |
| ..... | ..... | ..... | ..... |
| ..... | ..... | ..... | ..... |
| 10 | 5860 | 2170 | 0° |

FIG. 9

■Input video arrangement information

| Input video no. | X coordinate | Y coordinate | X width | Y width | Rotation angle |
|---|---|---|---|---|---|
| 1 | 110 | 20 | 2870 | 2700 | 0° |
| 2 | 2980 | 20 | 1920 | 3760 | 0° |
| 3 | 4900 | 1090 | 2870 | 2700 | 0° |

FIG. 11A
FIG. 11B
FIG. 11C
Input video 1
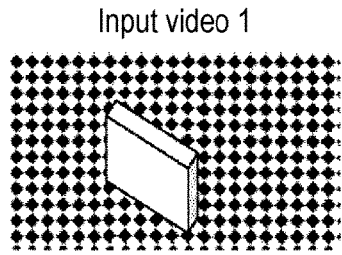
Input video 2
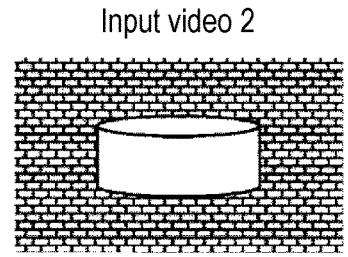
Input video 3
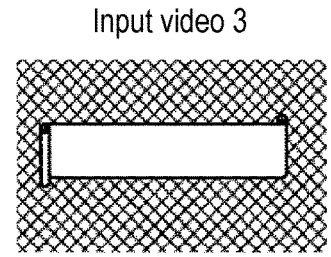
FIG. 11D
Display
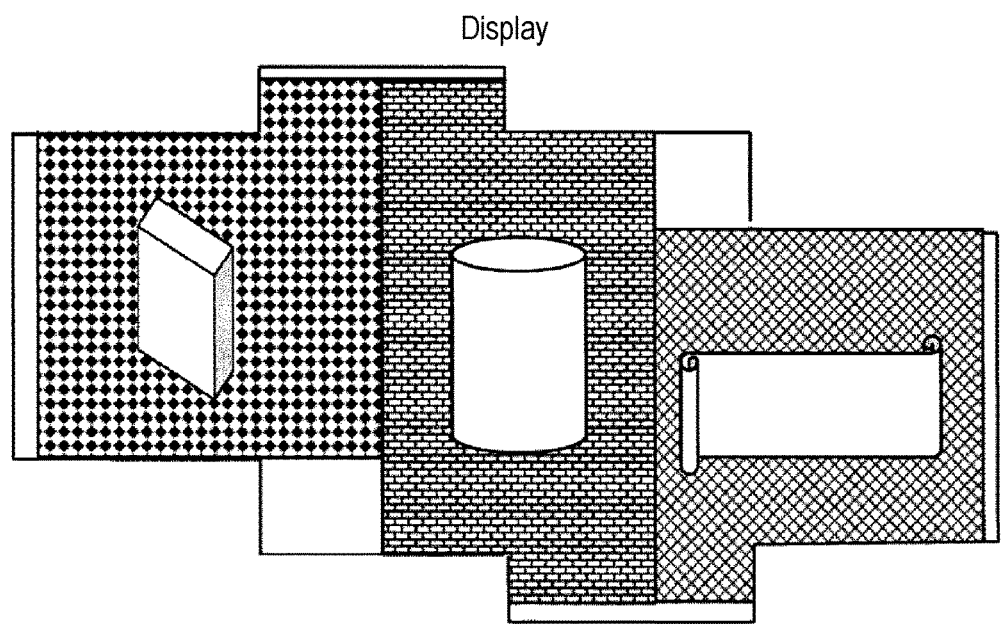

IMAGE DISPLAY SYSTEM

BACKGROUND

1. Technical Field

The present disclosure relates to an image display system.

2. Description of the Related Art

There has been known a multi-display that constitutes a single screen by making use of a plurality of display devices and is capable of displaying an image on a large-screen with high resolution (for example, Patent Literature 1). For example, by arranging four display devices with a resolution of 1920×1080 vertically and four horizontally, a multi-display with a resolution of 8K resolution can be configured. In recent years, the number of display devices constituting a multi-display has increased, and accordingly, such a multi-display has been larger and the definition thereof has been enhanced.

To each of display devices constituting such a multi-display, a video signal is supplied from a video output device. Each display device has an input terminal (for example, HDMI (registered trademark) terminal) for receiving a video signal from the video output device, and displays an image based on a video signal received from the input terminal.

CITATION LIST

Patent Literature

PTL1: Unexamined Japanese Patent Publication No. 2008-281717
PTL 2: Unexamined Japanese Patent Publication No. 2013-153410

SUMMARY

When display devices constituting a multi-display are installed, it is necessary to check to which of the input terminals of the display devices an output terminal of a video output device should be connected, and thereby make an appropriate connection.

Alternatively, there is a case in which a video signal from a video output device is transmitted to each of display devices constituting a multi-display by making use of a network technique (VoIP (Voice over Internet Protocol)) for superimposing a plurality of video signals on a single network cable and transmitting the signals. In this case, when each display device is installed, it is necessary to checking the network setting (IP address) of the display device, and thereby make an appropriate connection.

However, with an increase in the number of display devices constituting a multi-display, it is more likely to cause an error in physical connection between the output terminal of a video output device and the input terminal of the display device. Furthermore, also in VoIP for superimposing a plurality of video image data on a network cable and transmitting the data, it is more likely to cause an error in, for example, network setting between each display device and video output device. These errors cause an unintended video to be displayed on an unintended display device in a multi-display. Therefore, in order to realize a desired display state, an operation of correcting the connection and setting is needed.

The present disclosure provides an image display system for constituting a display screen with a plurality of display devices, the image display system allowing simpler initial settings.

An image display system according to the present disclosure includes: a plurality of display devices arranged in an arbitrary layout; an image processing unit for receiving input of a plurality of input video signals and generating an output video signal for each display device in accordance with the layout from the input video signals; a pattern signal generation unit for generating pattern signals respectively indicating a plurality of different test pattern images; a selector for receiving input of the output video signals and the pattern signals and selecting and outputting either the output video signals or the pattern signals; an imaging device for capturing an image of the test pattern images displayed on the respective display devices; and a control device for analyzing the captured image captured by the imaging device and generating control information for controlling the image processing unit based on analysis results.

The image display system according to the present disclosure automatically recognizes the arrangement of display devices and allocates video signals to the display devices, and thus allows simpler initial settings in the installation of the plurality of display devices.

BRIEF DESCRIPTION OF THE DRAWINGS

FIG. 7 illustrates an exemplary configuration of display arrangement information in Embodiment 1.

FIG. 9 illustrates an exemplary configuration of input signal arrangement information in Embodiment 1.

FIG. 11A illustrates an input video based on an input video signal in Embodiment 1.

FIG. 11B illustrates an input video based on an input video signal in Embodiment 1.

FIG. 11C illustrates an input video based on an input video signal in Embodiment 1.

FIG. 11D illustrates a display example of the multi-display when input videos are allocated to displays.

DETAILED DESCRIPTION

Embodiments will now be described in detail with reference to the drawings as needed. It should be noted that, sometimes, a detailed description more than necessary will not be provided. For example, a detailed description of already well-known matters and a repeated description of substantially the same constituents will not sometimes be provided. This is for the purpose of avoiding unnecessary redundancy of the following description and facilitating understanding by those skilled in the art.

The inventor(s) provides the accompanying drawings and the following description for sufficient understanding of this disclosure by those skilled in the art and it is not intended to limit the subject matter described in the claims to these drawings and description.

Embodiment 1

[1-1. Configuration]

Figure 1:
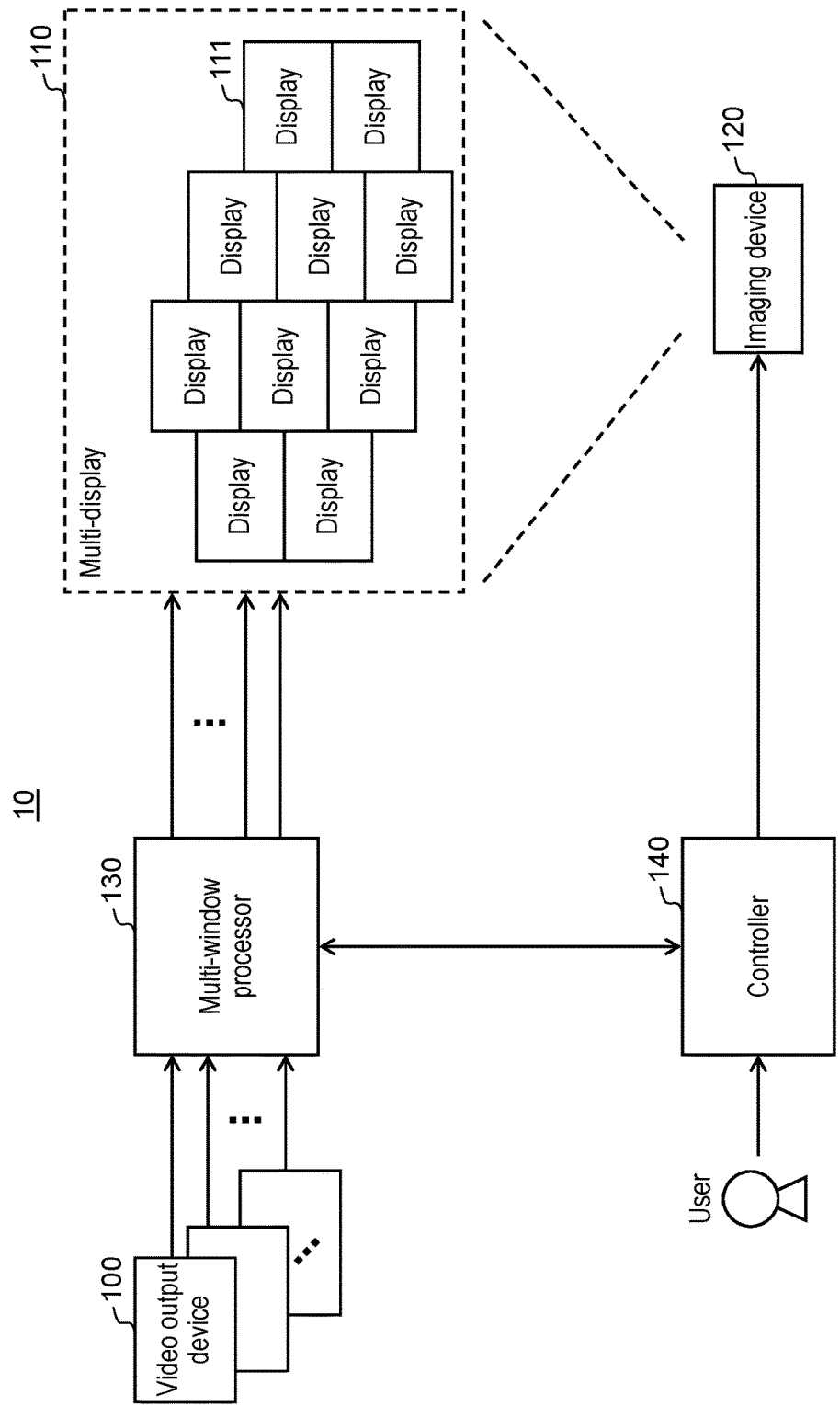
FIG. 1 is a block diagram illustrating the configuration of a multi-display system in Embodiment 1.

FIG. 1 is a block diagram illustrating the configuration of multi-display system 10 in Embodiment 1. Multi-display system 10 includes a plurality of video output devices 100, multi-display 110, imaging device 120, multi-window processor 130, and controller 140. It should be noted that, in the present embodiment, multi-display system 10 is an exemplary image display system.

Video output device 100 is a video signal source for outputting a video signal for a video to be displayed on multi-display 110. In the present embodiment, multi-display system 10 includes a plurality of video output devices 100. It should be noted that, in the present embodiment, a video signal outputted from video output device 100 is referred to as an input video signal.

Multi-display 110 includes a plurality of displays 111 arranged in an arbitrary layout. In the present embodiment, multi-display 110 includes ten displays 111. Each display 111 is a display device with full high-definition resolution. It should be noted that, in the present embodiment, display 111 is a liquid crystal display or an organic EL display.

Multi-window processor 130 performs image processing on a plurality of input video signals inputted from the plurality of respective video output devices 100. From the input video signals, multi-window processor 130 generates an output video signal for each of displays 111 which constitute multi-display 110. The generated output video signals are outputted to multi-display 110. Display 111 of multi-display 110 displays a video, based on the output video signal inputted from multi-window processor 130. Next, the configuration of multi-window processor 130 will now be described.

Figure 2:
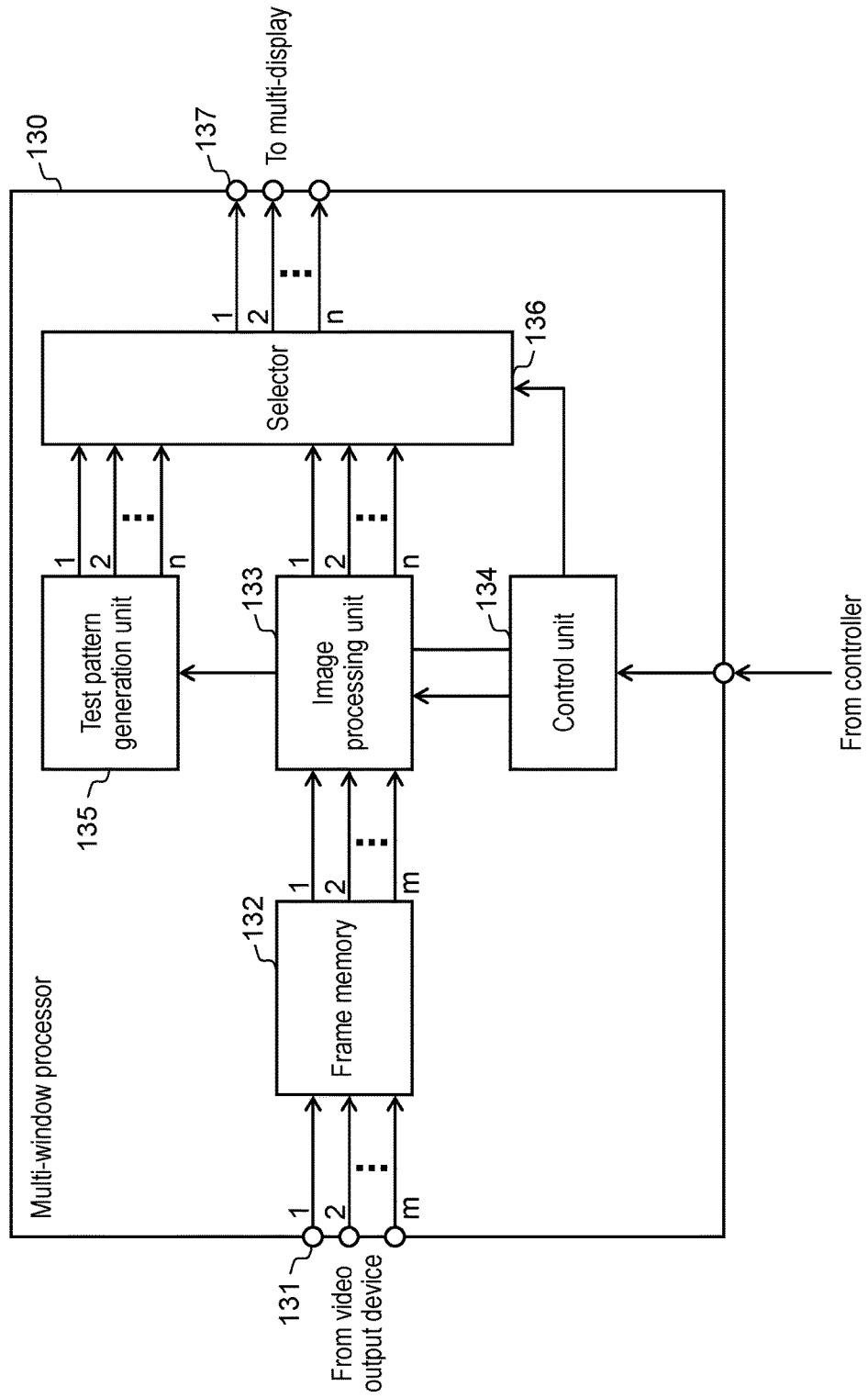
FIG. 2 is a block diagram illustrating the configuration of a multi-window processor in Embodiment 1.

FIG. 2 is a block diagram illustrating the configuration of multi-window processor 130 in Embodiment 1. Multi-window processor 130 includes input terminal 131, frame memory 132, image processing unit 133, control unit 134, and test pattern generation unit 135, selector 136, and output terminal 137.

Multi-window processor 130 includes a plurality of input terminals 131, and as illustrated in FIG. 2, in the present embodiment, the number of input terminals 131 is m (m=1, 2 . . . ). An input video signal inputted from video output device 100 is outputted to frame memory 132 via input terminal 131.

Frame memory 132 temporarily stores the input video signal inputted via input terminal 131. After temporarily stored in frame memory 132, the input video signal is outputted to image processing unit 133. Frame memory 132 and image processing unit 133 are connected to each other with, for example, m pieces of cable or a circuit pattern.

Image processing unit 133 processes an input video signal. To image processing unit 133, a plurality of the input video signals is inputted via frame memory 132. From the inputted input video signals, image processing unit 133 generates an output video signal for each display 111 in accordance with the layout for displays 111. The output video signals generated in image processing unit 133 are outputted to selector 136. In the present embodiment, image processing unit 133 and selector 136 are connected to each other with, for example, n pieces of cable (n=1, 2 . . . ) or a circuit pattern. Image processing unit 133 outputs n output video signals to selector 136.

Control unit 134 controls image processing unit 133. The details of the control will be described later.

Test pattern generation unit 135 generates test pattern signals respectively indicating a plurality of different test pattern images. The generated test pattern signals are outputted to selector 136. In the present embodiment, test pattern generation unit 135 and selector 136 are connected to each other with, for example, n pieces of cable or a circuit pattern. Test pattern generation unit 135 generates n test pattern signals, and the generated n test pattern signals are outputted to selector 136.

To selector 136, output video signals from image processing unit 133 and test pattern signals from test pattern generation unit 135 are inputted, and selector 136 selectively outputs either the output video signal or the test pattern signal to output terminal 137.

Multi-window processor 130 includes a plurality of output terminals 137 for outputting a signal inputted from selector 136. Each of output terminals 137 is connected to a corresponding one of displays 111 via a corresponding one of cables. It should be noted that, in the present embodiment, the number of output terminals 137 is n.

In the present embodiment, test pattern generation unit 135, image processing unit 133, and control unit 134 of multi-window processor 130 are each independently or integrally assembled into a hardware circuit (for example, FPGA (Field-Programmable Gate Array) or ASIC (Application Specific Integrated Circuit)). Alternatively, test pattern generation unit 135, image processing unit 133, and control unit 134 are each independently or integrally assembled into a CPU (Central Processing Unit) or MPU (Micro-Processing Unit) for executing a program to perform a predetermined function.

Referring back to FIG. 1, imaging device 120 includes an image sensor such as a CCD (Charge Coupled Device) or CMOS (Complementary Metal Oxide Semiconductor) image sensor, thereby capturing an image of a subject and generating image data. Imaging device 120 captures an image of the display screen of multi-display 110 serving as a subject, and generates image data. In other words, imaging device 120 captures an image based on the output video signals and the test pattern signals and displayed on the plurality of displays 111, and generates image data.

Controller 140 is a device for receiving a user's instruction and controlling multi-window processor 130 in accordance with the user's instruction. Controller 140 includes, for example, a personal computer. Controller 140 analyzes an image captured by imaging device 120, and, based on analysis results, generates control information for controlling image processing unit 133. Next, the configuration of controller 140 will be described.

Figure 3:
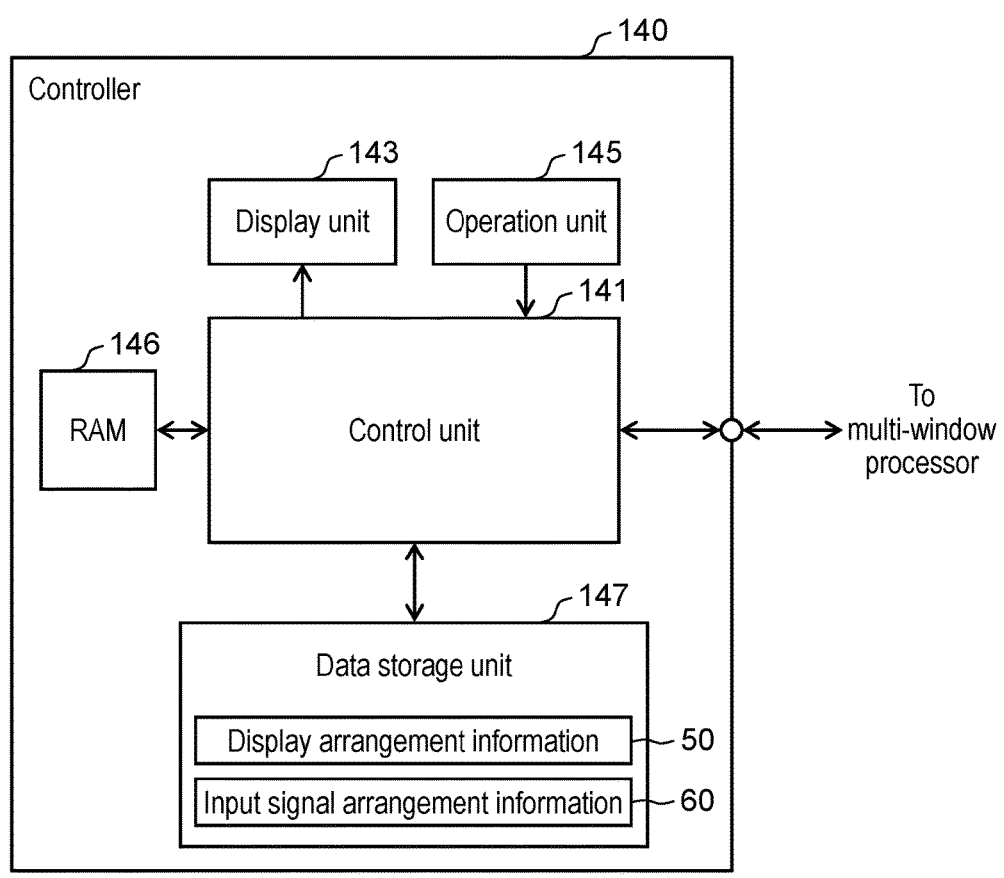
FIG. 3 is a block diagram illustrating the configuration of a controller in Embodiment 1.

FIG. 3 is a block diagram illustrating the configuration of controller 140 in Embodiment 1. Controller 140 includes control unit 141 for controlling the whole operation of controller 140, display unit 143 for displaying various information, operation unit 145 operated by a user, RAM (Random Access Memory) 146, and data storage unit 147 for storing data and programs.

Display unit 143 includes, for example, a liquid crystal display or an organic EL display. Operation unit 145 includes, for example, a touch panel, a keyboard, a mouse, and a button.

RAM 146 includes, for example, a semiconductor device such as DRAM (Dynamic Random Access Memory) or SRAM (Static Random Access Memory), and temporarily stores data as well as functions as a working area for control unit 141.

Data storage unit 147 is a storage medium for storing parameters, data, and control programs that are necessary to perform a predetermined function. Data storage unit 147 includes, for example, a hard disk drive (HDD) or a solid state drive (SSD).

Control unit 141 is a CPU and executes a control program (software) to perform a predetermined function. Control unit 141 is not limited to a CPU, and can be various electronic circuits, such as MPU, GPU (Graphics Processing Unit), FPGA, and ASIC, that perform a predetermined function.

[1-2. Operation]

The operation of multi-display system 10 having the above-described configuration will be described below.

[1-2-1. Video Display Operation]

First, a normal video-display operation in multi-display system 10 will be described using FIG. 1 and FIG. 2. A plurality of video output devices 100 outputs input video signals to multi-window processor 130. To multi-window processor 130, an input video signal is inputted from each of video output devices 100 via a corresponding one of a plurality of input terminals 131. The input video signal inputted from each of input terminals 131 is stored in frame memory 132.

Image processing unit 133 reads the input video signal inputted via each input terminal 131 and stored in frame memory 132. Furthermore, image processing unit 133 receives a control signal containing a control parameter from control unit 134. The control signal is inputted from controller 140. The control parameter includes information on, for example, the display position, enlargement/reduction, cutting-out, and arrangement priority in multilayer processing of an input video signal for each display 111. Image processing unit 133 performs image processing, based on an input video signal inputted to each input terminal 131 and a control parameter received from control unit 134. The input video signal subjected to the image processing is outputted as an output video signal from image processing unit 133 via selector 136 to each output terminal 137. The output video signal outputted from each output terminal 137 is inputted to a corresponding one of displays 111. Each display 111 displays an image based on a corresponding one of the output video signals. In other words, image processing unit 133 generates an output video signal for each display 111, that is, for each output terminal 137, based on an input video signal and a control signal, and outputs the output video signal to each output terminal 137. Thus, a desired video is displayed in the entirety of multi-display 110.

Here, in multi-display system 10, each of video output terminals (output terminals 137) of multi-window processor 130 needs to be connected to the input terminal of a corresponding predetermined one of displays 111. In the case where a predetermined one of output terminals 137 is not connected to the input terminal of the corresponding predetermined one of displays 111, a desired image cannot be obtained in the display screen of multi-display 110. Furthermore, each output video signal outputted from a corresponding one of output terminals 137 of multi-window processor 130 needs to be generated in accordance with the relative position of a corresponding one of displays 111. However, in the event of a connection mismatch between output terminal 137 and the input terminal of display 111, an image misalignment at a boundary portion between displays 111 is caused. The image misalignment mentioned herein means that, on display 111 on which a predetermined image should be displayed, a different image therefrom is displayed.

In other words, in the case where each output terminal 137 of multi-window processor 130 is not correctly connected to the input terminal of a corresponding one of displays 111, a failure in which a desired image is not displayed on multi-display 110 is caused. Furthermore, display 111 is sometimes installed in portrait orientation. In this case, an output video signal corresponding to the orientation needs to be outputted. To correct the above-mentioned failure, the connection between output terminal 137 and the input terminal of display 111 needs to be corrected, but, with an increase in the number of displays 111 to be installed, time and manpower required for identifying a point where the failure has been caused and for correcting the failure have been increased. To solve the above-mentioned problem, multi-display system 10 according to the present embodiment has an initial adjustment function. Multi-display system 10 according to the present embodiment includes imaging device 120, and is capable of automatically detecting a point of connection failure and correcting the failure. This allows initial settings for multi-display system 10, and detection of a failure point and correction of the failure to be made easier. Hereinafter, an operation for executing this initial adjustment function will be described.

[1-2-2. Initial Adjustment Operation]

In multi-display system 10 according to the present disclosure, the initial adjustment operation is performed, for example, when multi-display 110 is newly installed or the arrangement of displays 111 in multi-display 110 is changed. Hereinafter, a procedure of the initial adjustment operation will be described.

In the initial adjustment operation, first, controller 140 (that is, control unit 141) causes displays 111 to display different test pattern images for initial adjustment. For this, controller 140 outputs a control signal for displaying the test pattern images to multi-window processor 130.

Next, when receiving this control signal, control unit 134 controls test pattern generation unit 135. Test pattern generation unit 135 is controlled by control unit 134 and generates video signals respectively indicating different test pattern images (hereinafter, referred to as "test pattern signals"), the signals being equal in number to output terminals 137. Such a test pattern signal is a signal independent from a video signal inputted from outside. It should be noted that the video signal inputted from outside mentioned herein is an input video signal inputted from video output device 100 in the present embodiment. At this time, selector 136 changes a path in accordance with the control signal from control unit 134 so as to output the test pattern signals from test pattern generation unit 135 to output terminal 137. As a result, in the initial adjustment operation, the test pattern signals are outputted from respective output terminals 137 to respective displays 111. Different displays 111 display different test pattern images, based on the respective test pattern signals. Hereinafter, such a test pattern image will be described.

Figure 4:
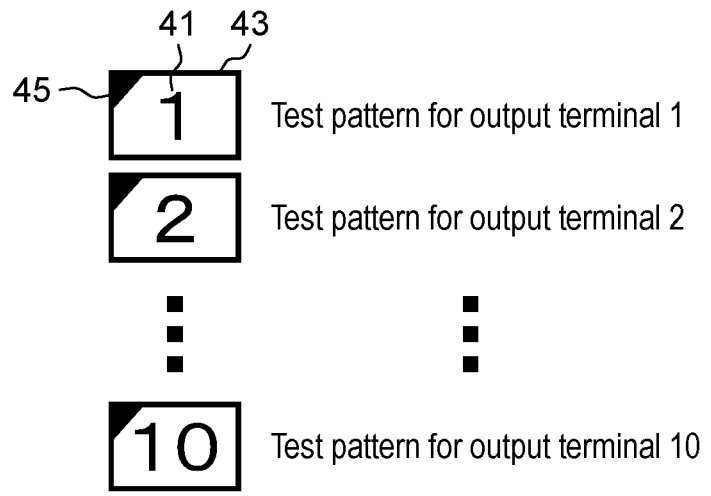
FIG. 4 illustrates exemplary test pattern images in Embodiment 1.

FIG. 4 illustrates exemplary test pattern images in Embodiment 1. Based on test pattern signals generated by test pattern generation unit 135, test pattern images are displayed on respective displays 111. As illustrated in FIG. 4, the test pattern images have different image patterns for different output terminals 137. Specifically, at the center of such a test pattern image, information 41 indicating an output terminal number is arranged. Furthermore, the test pattern image has frame 43 for recognizing the edge of the display region of display 111. Furthermore, the test pattern image includes image 45 (a triangular image arranged at the upper left corner of a test pattern in FIG. 4) for indicating the rotation direction (orientation) of display 111 (image). It should be noted that the test pattern image is not limited to the example illustrated in FIG. 4, but is only required to be an image pattern that allows information on the arrangement of each display 111 to be detected. For example, the test pattern images may be different in vertical frequency and horizontal frequency for different displays 111. Alternatively, by switching between output terminals 137 in accordance with a control signal from controller 140, the same test pattern signal may be sequentially outputted from different output terminals 137. In this case, the same test pattern image is sequentially displayed on displays 111.

Figure 5:
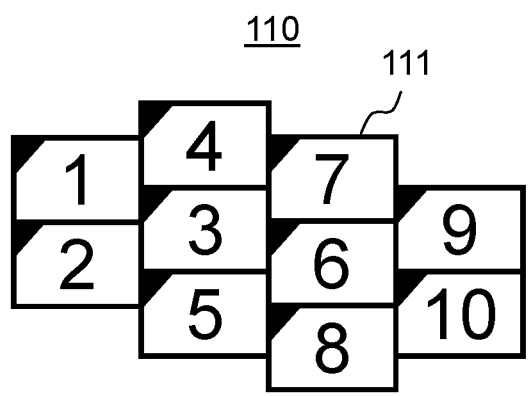
FIG. 5 illustrates a display example of the display screen of the entirety of a multi-display when test pattern images are displayed on respective displays in Embodiment 1.

FIG. 5 illustrates a display example of the display screen of the entirety of multi-display 110 when test pattern images are displayed on respective displays 111 in Embodiment 1. Here, a display connected to output terminal n is expressed as display (n). As illustrated in FIG. 5, different displays 111 (that is, different output terminals 137) display different test pattern images.

Next, in the initial adjustment operation, in a state in which test pattern images are displayed on respective displays 111, controller 140 outputs, to imaging device 120, a control signal for capturing an image of the display screen of multi-display 110. In accordance with the control signal from controller 140, imaging device 120 captures an image of the display screen of multi-display 110 on which the test pattern images are displayed (for example, see FIG. 5), and transmits data on the captured image to controller 140. In other words, imaging device 120 captures an image of the display screen of multi-display 110, resulting in capturing test pattern images displayed on respective displays 111.

Next, controller 140 (that is, control unit 141) analyzes the data on the captured image received from imaging device 120, and detects to which display 111 each output terminal 137 is connected and detects the relative positional relationships between displays 111. For example, when receiving data on a captured image which is obtained by capturing an image of a display screen illustrated in FIG. 5, controller 140 can detect that output terminal 1 is connected to display 1 on the upper left side and output terminal 2 is connected to display 2 on the lower left side. Furthermore, controller 140 can recognize the relative positional relationships (arrangement) between displays 111 from data on a captured image. In other words, an image of the display screen of multi-display 110 is captured by imaging device 120, whereby controller 140 can recognize the arrangement of displays 111.

Then, in accordance with the analysis results of data on the captured image, controller 140 determines control information for controlling image processing unit 133 of multi-window processor 130. Furthermore, in accordance with the analysis results of the data on the captured image, controller 140 sets display arrangement information 50 (see FIG. 7). Display arrangement information 50 is information for defining the positions of displays 111 on a user interface screen of controller 140. A user can set the arrangement of videos based on input video signals on the user interface screen.

Here, the user interface screen (hereinafter, referred to as a "UI screen") will be described. The UI screen is a screen for a user to arrange videos based on input video signals on respective displays 111. The UI screen is displayed on display unit 143 by control unit 141 of controller 140. While checking the arrangement of displays 111 on the UI screen displayed on display unit 143, a user can arrange videos based on input video signals on multi-display 110 (the details will be described later).

Figure 6:
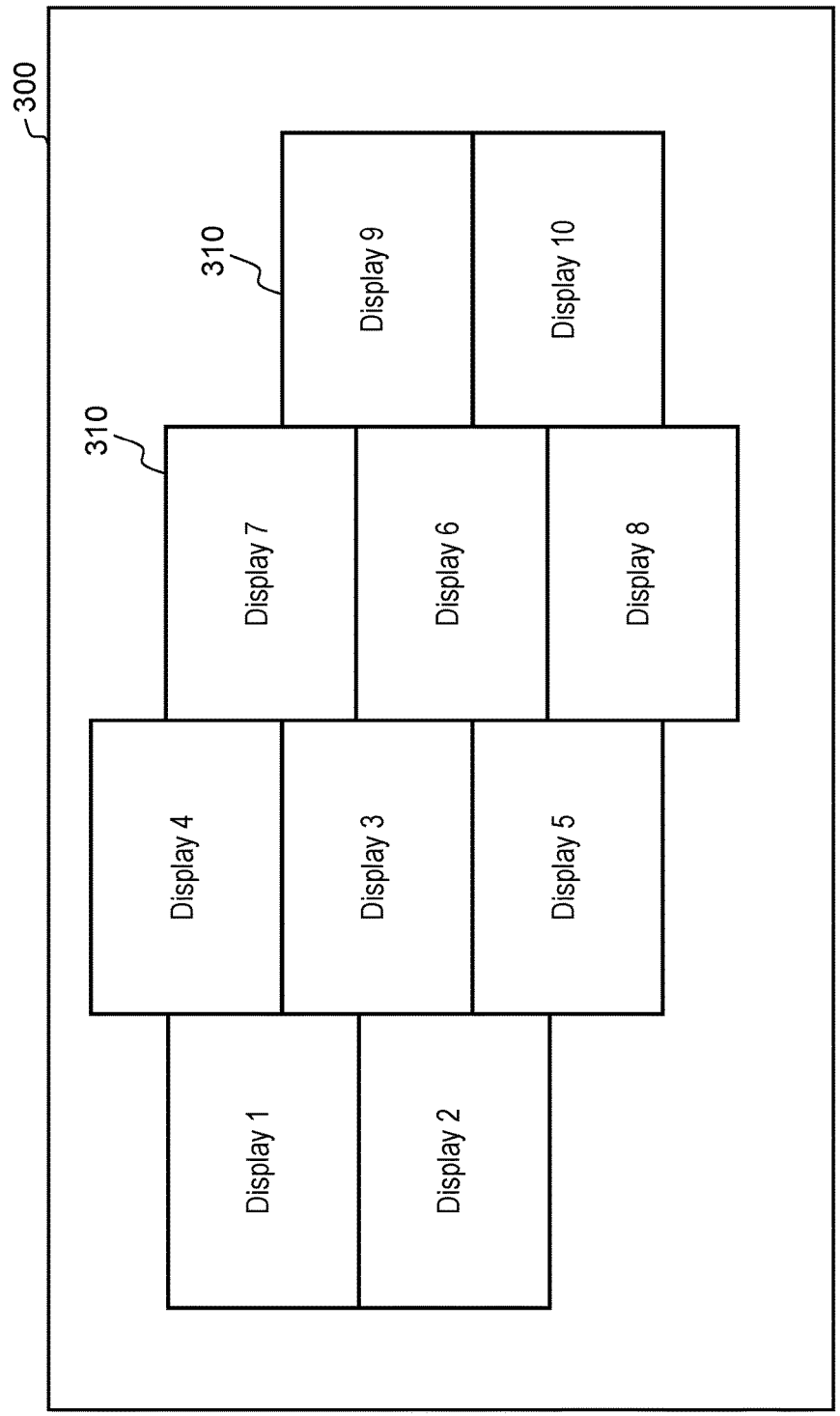
FIG. 6 illustrates an exemplary user interface screen in which display objects are arranged in Embodiment 1.

FIG. 6 illustrates an exemplary UI screen on which display objects 310 are arranged in Embodiment 1. As illustrated in FIG. 6, the UI screen includes campus region 300 having a predetermined area, and display objects 310. Display object 310 is an object indicating display 111 on the UI screen. Display objects 310 are arranged in campus region 300, based on the results of analysis (that is, display detection results) of data on a captured image by controller 140 (control unit 141). By referring to such UI screen, a user can easily check the arrangement of displays 111.

FIG. 7 illustrates an exemplary configuration of display arrangement information 50 in Embodiment 1. Display arrangement information 50 defines the arrangement of display objects 310 in campus region 300. As illustrated in FIG. 7, the X coordinate, Y coordinate, and rotation angle of each of a plurality of display objects 310 in campus region 300 are detected from data on a captured image, and are managed as display arrangement information 50. Display arrangement information 50 is generated through an analysis of data on captured test pattern images by controller 140 (control unit 141), and stored in data storage unit 147. In other words, controller 140 analyzes data on captured test pattern images and detects the position (X and Y coordinates) and rotation angle of each display 111, and information on the detection results is stored in data storage unit 147 as display arrangement information 50. Multi-window processor 130 uses this display arrangement information 50 as a control parameter for arranging videos based on input video signals on respective displays 111. The value of a control parameter serving as display arrangement information 50 can be manually corrected by a user. In other words, by operating operation unit 145 of controller 140, a user can change the value of a control parameter serving as display arrangement information 50.

As illustrated in FIG. 6, by using the UI screen on which display objects 310 are arranged, a user can arrange (allocate) videos based on input video signals on (to) respective displays 111. Hereinafter, the arrangement of videos based on input video signals on displays 111 by using the UI screen will be described.

Figure 8:
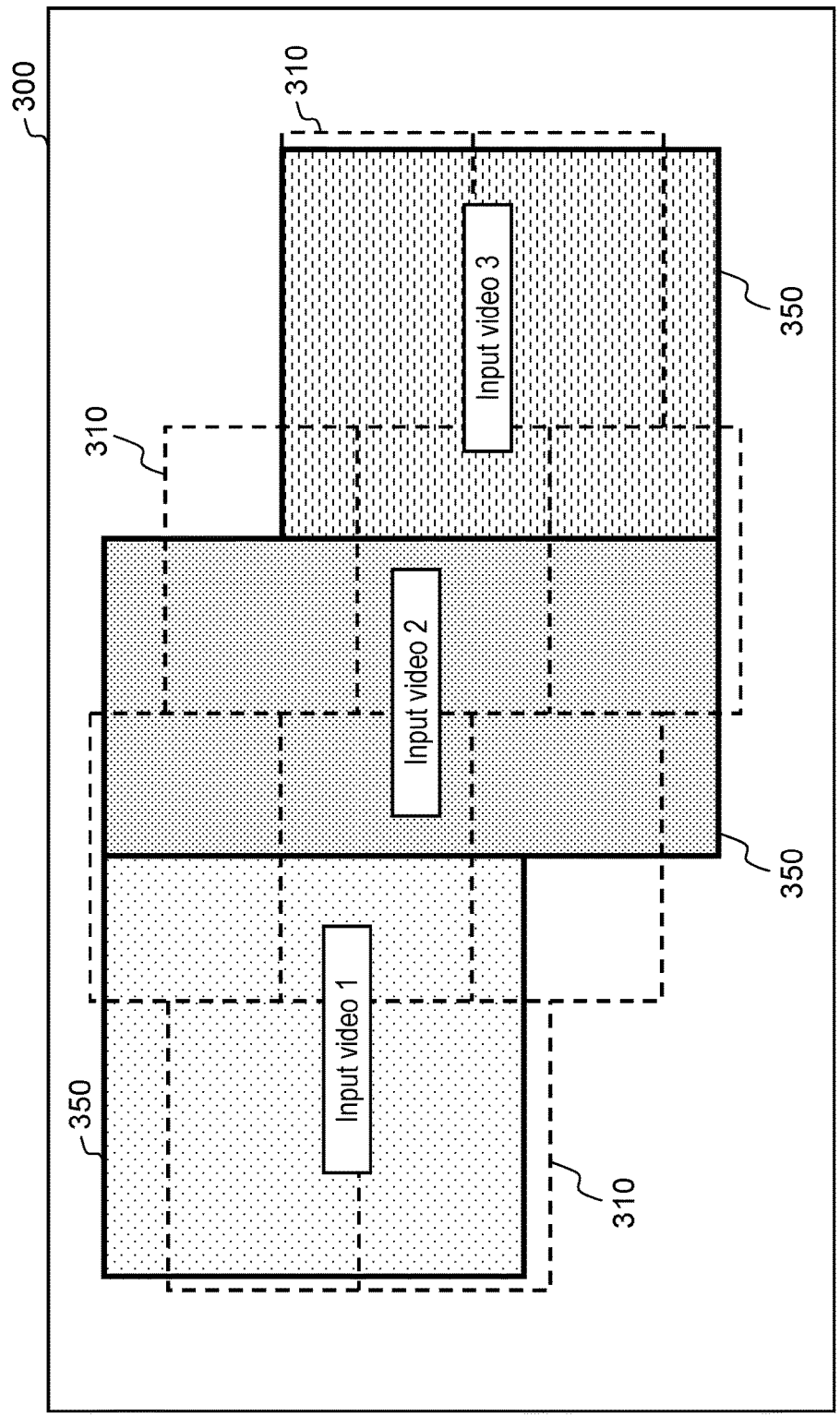
FIG. 8 illustrates an exemplary user interface screen in which input signal objects are arranged so as to be superimposed on the display objects in Embodiment 1.

FIG. 8 illustrates an exemplary UI screen on which input signal objects 350 are arranged so as to be superimposed on display objects 310 in Embodiment 1. As illustrated in FIG. 8, on the UI screen, videos (namely, input videos 1 to 3) based on input video signals can be arranged so as to be superimposed on display objects 310 arranged in campus region 300. Input signal objects 350 are input videos 1 to 3 arranged in campus region 300. By thus arranging input videos 1 to 3 as input signal objects 350 so as to superimpose on display objects 310, the display positions of input videos 1 to 3 on the display screen of multi-display 110 can be set.

A user can arrange input signal objects 350 in campus region 300, for example, by a drag-and-drop operation. Furthermore, by operating operation unit 145 on the UI screen, a user can arbitrarily change the settings of the positions of input signal objects 350 and the sizes (length and width) of input signal objects 350. In FIG. 8, respective input signal objects 350 for input video 1, input video 2, and input video 3 are arranged so as to be superimposed on display objects 310 of displays 111.

FIG. 9 illustrates an exemplary configuration of input video arrangement information 60 in Embodiment 1. Input video arrangement information 60 indicates the arrangement positions on the UI screen of input signal objects 350 arranged on the UI screen. Furthermore, input video arrangement information 60 includes the X and Y coordinates in campus region 300 and the size (length and width) and the rotation information of input signal objects 350, namely, input videos 1 to 3. FIG. 9 indicates the value of each parameter of input video arrangement information 60 at the time when input videos 1 to 3 are arranged in campus region 300 as illustrated in FIG. 8. Input video arrangement information 60 is used as a control parameter for arranging input videos by image processing unit 133 of multi-window processor 130. The parameter value of input video arrangement information 60 can be changed manually by a user. In other words, by operating operation unit 145 of controller 140, a user can change the value of a control parameter serving as input video arrangement information 60.

In the case where input videos 1 to 3 are arranged on display objects 310 as illustrated in FIG. 8, a part of input video 1 is cut out and arranged at a position corresponding to display 1. A part of input video 1 and a part of input video 2 are cut out and arranged at a position corresponding to display 4. Furthermore, a part of input video 2 and a part of input video 3 are cut out and arranged at a position corresponding to display 6.

When display arrangement information 50 and input video arrangement information 60 are set, controller 140 transmits a control signal including display arrangement information 50 and input video arrangement information 60 to multi-window processor 130. In multi-window processor 130, control unit 134 generates a control parameter based on the control signal from controller 140, and transmits the control parameter to image processing unit 133.

Figure 10:
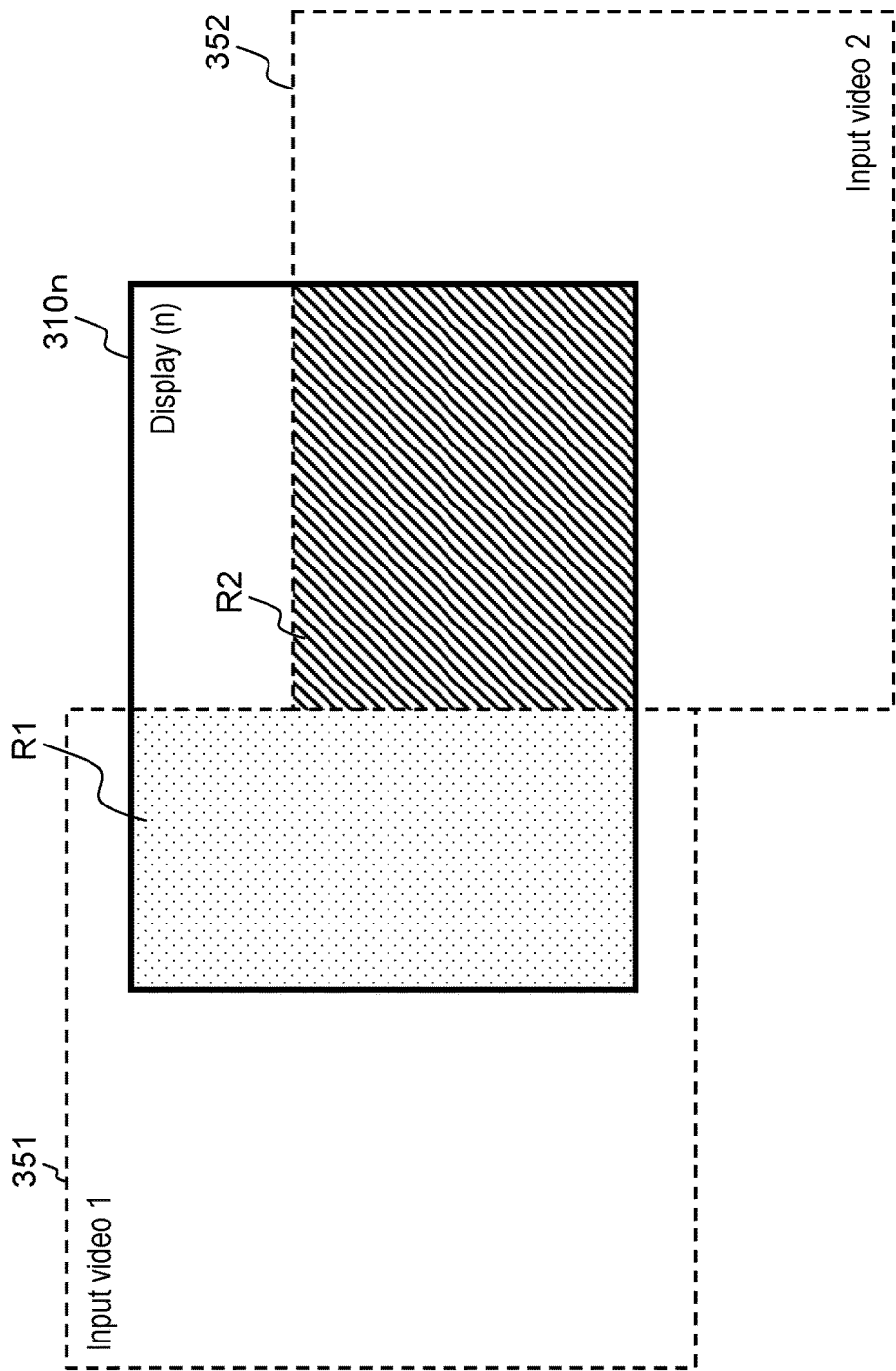
FIG. 10 is a diagram to describe allocation processing of input videos to a display (n) in Embodiment 1.

Specifically, based on the shape and size of input signal objects 350, control unit 134 determines the enlargement or reduction ratio of input videos 1 to 3. Furthermore, control unit 134 detects an overlapping region between display objects 310 and input signal objects 350. FIG. 10 is a diagram to describe allocation processing of input videos 1 and 2 to display (n) in Embodiment 1. For example, a description will be given about a case in which, as illustrated in FIG. 10, input signal object 351 for input video 1 and input signal object 352 for input video 2 are arranged in the region of display object 310n of display (n). First, control unit 134 detects overlapping region R1 between display object 310n and input signal object 351, and detects overlapping region R2 between display object 310n and input signal object 352. Then, based on regions R1 and R2, control unit 134 determines a cut-out position and cut-out size of input videos 1 and 2.

Up to this point, the allocation processing of input videos 1 and 2 to display (n) has been described. For each display, control unit 134 transmits, to image processing unit 133, information about an input video to be arranged on the display, such as the enlargement/reduction ratio, cut-out position, cut-out size, arrangement position on the display, rotation angle of the input video, as a control parameter.

Image processing unit 133 stores, inside thereof, the control parameters received from control unit 134. Here ends the adjustment operation in multi-display system 10.

A subsequent operation is as explained in the description about the normal video-display operation in multi-display system 10 In other words, based on input video signals inputted via a plurality of input terminals 131 and control parameters, image processing unit 133 generates output video signals to be outputted to respective output terminals 137 (respective displays 111). The generated output video signals are outputted to respective displays 111 via respective output terminals 137. Thus, a video is displayed on the multi-display 110 in an arrangement that has been set on the UI screen.

For example, in the example illustrated in FIG. 10, image processing unit 133 enlarges/reduces input video 1, based on the enlargement/reduction ratio of an input video signal for input video 1, and cut out a portion corresponding to R1 in enlarged/reduced input video 1. Likewise, image processing unit 133 enlarges/reduces input video 2, based on the enlargement/reduction ratio of an input video signal for input video 2, and cut out a portion corresponding to R2 in enlarged/reduced input video 2. Then, image processing unit 133 synthesizes the cut-out video corresponding to region R1 and the cut-out video corresponding to region R2, thereby generating an output video signal for a video to be outputted to display (n) (that is, a video signal to be outputted to output terminal n).

FIG. 11A to FIG. 11D illustrate exemplary display results of videos in multi-display 110 in the case where display arrangement information 50 and input video arrangement information 60 are set as shown in FIG. 6 to FIG. 9.

FIG. 11A illustrates input video 1 based on input video signal 1 in Embodiment 1. FIG. 11B illustrates input video 2 based on input video signal 2 in Embodiment 1. FIG. 11C illustrates input video 3 based on input video signal 3 in Embodiment 1. FIG. 11D illustrates a display example of multi-display 110 in the case where input videos 1 to 3 are allocated to displays. Image processing unit 133 of multi-window processor 130 performs the cut-out, enlargement/reduction, and rotation of input videos 1 to 3, based on control parameters inputted from control unit 134. In other words, image processing unit 133 performs the cut-out, enlargement/reduction, and rotation of input videos 1 to 3 indicated by respective input video signals 1 to 3, based on control parameters inputted from control unit 134, and generates output video signals. The generated output video signals are outputted to respective displays 111. Each display 111 displays a video based on a corresponding one of the inputted output video signals. Thus, as illustrated in FIG. 11D, a video in which consistency in connection between multi-window processor 130 and the input terminals of displays 111 is maintained is displayed on multi-display 110. In other words, an image can be correctly displayed as a whole on multi-display 110.

[1-3. Effects and Others]

As described above, multi-display system 10 (an exemplary image display system) in the present embodiment includes: a plurality of displays 111 (exemplary display devices) arranged in an arbitrary layout; image processing unit 133 for receiving input of a plurality of input video signals and generating an output video signal for each display 111 in accordance with the layout from the input video signals; test pattern generation unit 135 (an exemplary pattern signal generation unit) for generating pattern signals indicating a plurality of different test pattern images; selector 136 (an exemplary selector) for receiving input of the output video signals and the pattern signals and selecting and outputting either the output video signals or the test pattern signals; imaging device 120 (an exemplary imaging device) for capturing an image of the test pattern images displayed on respective displays 111; and controller 140 (an exemplary control device) for analyzing the captured image captured by imaging device 120 and generating control information for controlling image processing unit 133 based on analysis results.

With the above-described configuration, multi-display system 10 in the present embodiment recognize the arrangement of displays 111, based on an image obtained by capturing test pattern images, and generates an output video signal for each displays 111, accordingly. In other words, multi-display system 10 automatically recognizes the arrangement of displays 111, controls input video signals in accordance with the arrangement of displays 111, and generates output video signals. The generated output video signals are outputted to respective displays 111. This configuration allows output video signals to be automatically outputted to respective predetermined displays 111, even when output terminals 137 of multi-window processor 130 are not connected to respective predetermined displays 111. Thus, when connecting cables of multi-window processor 130 to displays 111, a user does not have to care about the connection destinations of output video signals, and does not have to make a cable replacement, for example. This makes easier the connection setting of displays 111 in multi-display system 10.

Furthermore, based on analysis results, controller 140 displays the UI screen on which display objects 310 (exemplary first objects) indicating respective displays 111 are displayed (see FIG. 8). By referring to this UI screen, a user can easily recognize the arrangement of displays 111.

Furthermore, based on analysis results, controller 140 generates display arrangement information 50 (exemplary first arrangement information) indicating the arrangement of displays 111 on the UI screen.

Display arrangement information 50 includes information on the positions and rotation angles of display objects 310 (that is, displays 111) on the UI screen. By referring to such display arrangement information 50, a user can recognize the positions and rotation angles of displays 111.

Furthermore, display arrangement information 50 can be changed by a user.

Furthermore, in accordance with a user's operation, controller 140 arranges input signal objects 350 (exemplary second objects) indicating respective videos based on input video signals on the UI screen. Furthermore, controller 140 generates input video arrangement information 60 (exemplary second arrangement information) indicating the arrangement of videos based on input video signals on the UI screen, based on the arrangement of input signal objects 350. This allows a user to freely arrange input signal objects 350 on the UI screen.

Input video arrangement information 60 includes information on the positions, sizes, and rotation angles of input signal objects 350 on the UI screen. Thus, by referring to input video arrangement information 60, a user can recognize the positions, sizes, and rotation angles of videos based on input video signals.

Image processing unit 133 generates output video signals for respective displays 111, based on the relative positional relationships between and sizes of display objects 310 and input signal objects 350 on the UI screen. This allows a user to easily set output videos for respective displays 111 only by arranging display objects 310 and input signal objects 350 on the UI screen at respective desired positions.

Embodiment 2

Figure 12:
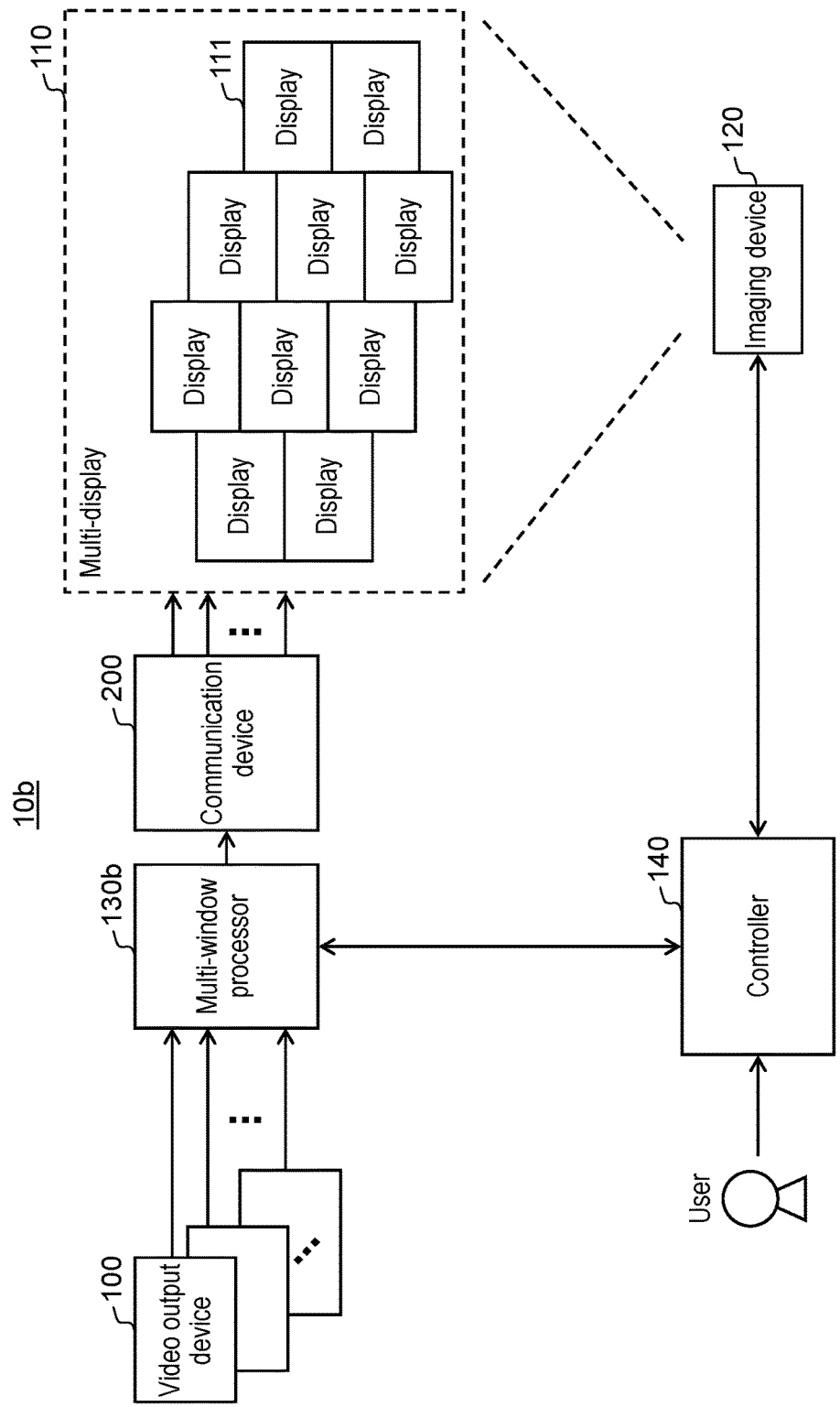
FIG. 12 is a block diagram illustrating the configuration of a multi-display system in Embodiment 2.

FIG. 12 is a diagram illustrating the configuration of multi-display system 10b in Embodiment 2. The configuration and operation of multi-display system 10b in the present embodiment are basically the same as those in Embodiment 1. Multi-display system 10b in Embodiment 2 differs from multi-display system 10 in Embodiment 1 in making use of a network technology such as VoIP, thereby superimposing a plurality of output video signals and transmitting the signals to displays 111 via one cable. Specifically, as illustrated in FIG. 12, displays 111 of multi-display 110 are network-connected to multi-window processor 130b via communication device 200. Communication device 200 is a networking device such as HUB. Multi-window processor 130b is connected to communication device 200 via one cable on which a plurality of output video signals are superimposed.

Figure 13:
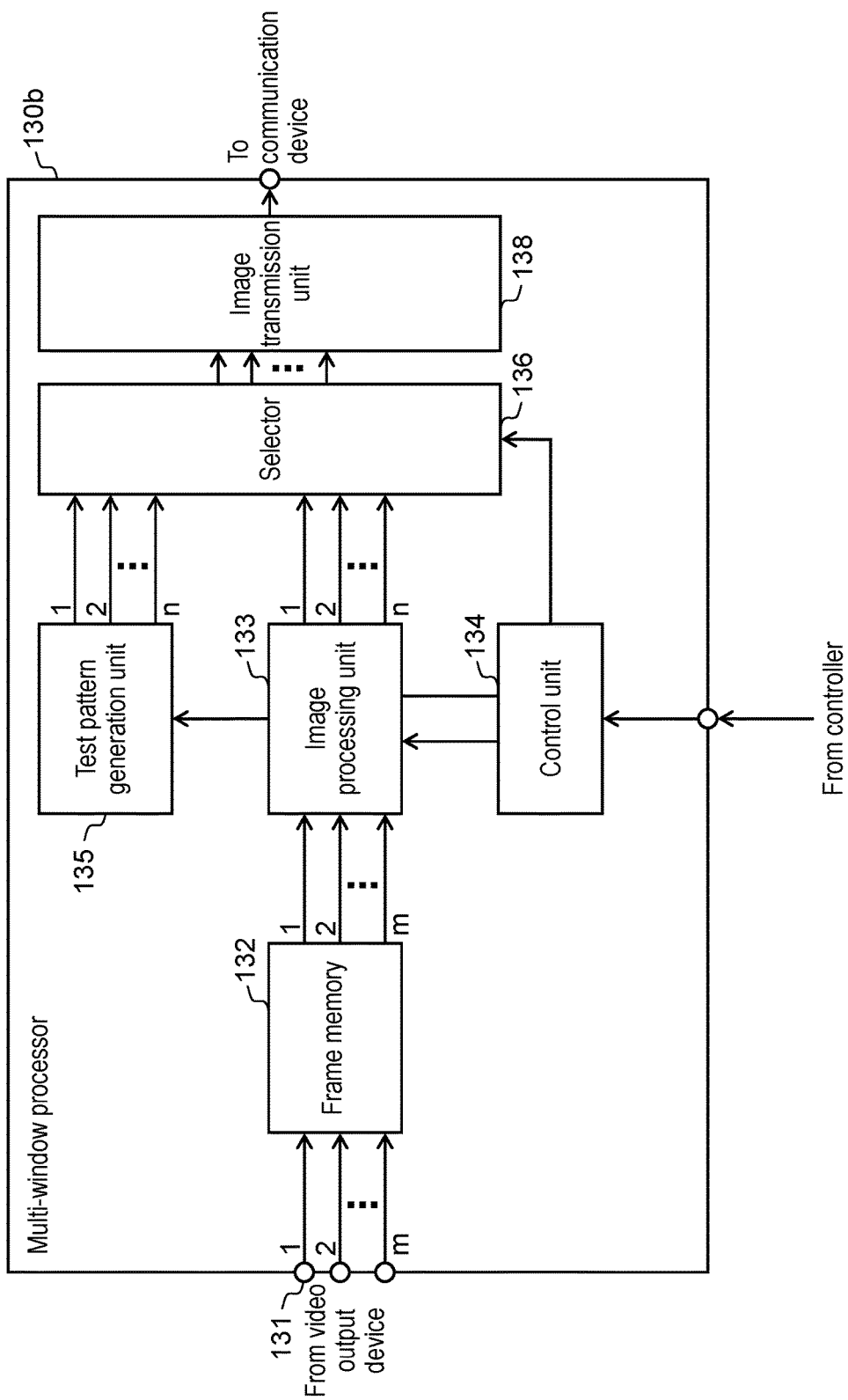
FIG. 13 is a block diagram illustrating the configuration of a multi-window processor in Embodiment 2.

FIG. 13 is a diagram illustrating the configuration of multi-window processor 130b in Embodiment 2. Multi-window processor 130b includes image transmission unit 138 for superimposing a plurality of signals (test pattern signals or output video signals) outputted from selector 136 on one cable and transmitting the signals. It should be noted that IP addresses are allocated to displays 111.

In the initial adjustment operation, test pattern signals from test pattern generation unit 135 are selected by selector 136 and outputted to image transmission unit 138. Image transmission unit 138 adds the IP addresses of displays 111 to the inputted test pattern signals, respectively, and outputs the signals to communication device 200. Communication device 200 transmits the test pattern signals each having its own IP address added thereto to displays 111 through a network. Out of the test pattern signals transmitted from communication device 200, each display 111 receives a test pattern signal having an IP address in agreement with the IP address of the display itself. Thus, on each display 111, a test pattern image based on a corresponding one of the test pattern signals is displayed.

Imaging device 120 captures an image of multi-display 110 on which the above-described test pattern images are displayed in accordance with a control signal from controller 140, and transmits the data of the captured image to controller 140. Controller 140 generates display arrangement information 50, based on the data of the captured image of the test pattern images. Furthermore, controller 140 generates input video arrangement information 60, based on the arrangement of input signal objects 350 arranged on the UI screen.

Subsequently, controller 140 transmits a control signal including display arrangement information 50 and input video arrangement information 60 to multi-window processor 130b.

In a normal video-display operation, image processing unit 133 of multi-window processor 130b generates output video signals outputted to respective displays 111, based on the control signal received from controller 140. The generated output video signals are outputted to selector 136. Selector 136 selects the output video signals from image processing unit 133 and outputs the signals to image transmission unit 138.

To an output video signal inputted from image processing unit 133 for each display 111, image transmission unit 138 adds the IP address of display 111, and outputs the signal to communication device 200. Communication device 200 transmits the output video signals each having its own IP address added thereto to displays 111 through a network. Each display 111 receives an output video signal whose IP address is in agreement with the IP address of the display itself, out of the output video signals transmitted from communication device 200. Thus, on each display 111, an image based on a corresponding one of the output video signals as is displayed As described above, multi-display system 10b in the present embodiment includes image transmission unit 138 for receiving input of output video signals and test pattern signals from selector 136 and adding IP addresses to the inputted output video signals and the inputted test pattern signals, respectively, and transmitting the signals. Display 111 receives, from image transmission unit 138, an output video signal and a test pattern signal to each of which an IP address has been added. Then, each display 111 displays an image based on the received output video signal and the received test pattern signal which has an IP address in agreement with the IP address of display 111.

Other Embodiments

Up to this point, Embodiments 1 and 2 have been described as examples of the technique disclosed in the present application. However, the technique according to the present disclosure is not limited to these examples, and is also applicable to embodiments in which modifications, substitutions, additions, omissions, and/or the like are suitably made. Furthermore, the constituents described in Embodiments 1 and 2 can be combined to provide a new embodiment. Other embodiments will now be described below.

In the above-mentioned embodiments, FIG. 1 and FIG. 5 illustrates an example of the layout of displays 111 in multi-display 110, but the layout of displays 111 is not limited to this example.

In the above-mentioned embodiments, the function of control unit 134 may be performed by image processing unit 133 or controller 140.

Alternatively, based on control information generated by a control device, an input video signal may be automatically corrected.

Up to this point, the embodiments have been described as examples of the technique in the present disclosure. For this description, the accompanying drawings and the detailed description have been provided.

Hence, some of the constituents shown in the accompanying drawings and the detailed description are essential for solving problems, but some are provided for the purpose of illustrating the above-described technique and may not be essential for solving problems. Therefore, such inessential constituents should not be readily construed as being essential based on the fact that such inessential components are shown in the accompanying drawings and the detailed description.

Furthermore, the above-described embodiments are provided for the purpose of exemplifying the technique in the present disclosure, and therefore, various modifications, substitutions, additions, and omissions may be made within the scope of the claims and the scope of the equivalents thereof.

The present disclosure is useful to a multi-display system in which a plurality of display devices constitutes one screen.

What is claimed is:
1. An image display system, comprising:
a plurality of display devices arranged in an arbitrary layout;
an image processing unit for receiving input of a plurality of input video signals and generating an output video signal for each display device in accordance with the layout from the input video signals;
a pattern signal generation unit for generating pattern signals respectively indicating a plurality of different test pattern images;
a selector for receiving input of the output video signals and the pattern signals and selecting and outputting either the output video signals or the pattern signals;
an imaging device for capturing an image of the test pattern images displayed on the respective display devices; and
a control device for analyzing the captured image captured by the imaging device and generating control information for controlling the image processing unit, based on analysis results,
wherein the control device displays a user interface screen on which first objects indicating the respective display devices are displayed, based on the analysis results,
wherein the control device generates first arrangement information indicating an arrangement of the display devices on the user interface screen, based on the analysis results, and
wherein the first arrangement information includes information indicating a position and a rotation angle of each of the first objects on the user interface screen.
2. The image display system according to claim 1, wherein the first arrangement information is changed by a user.
3. The image display system according to claim 1,
the system further comprising an image transmission unit for receiving input of the output video signals and the pattern signals from the selector and respectively adding IP addresses to the output video signals and the pattern signals and transmitting the output video signals and the pattern signals,
wherein each of the display devices receives, from the image transmission unit, the output video signal and the pattern signal to each of which the corresponding IP address has been added, and displays an image based on the received output video signal and pattern signal each having the IP address in agreement with an IP address of the display device.
4. An image display system, comprising:
a plurality of display devices arranged in an arbitrary layout;
an image processing unit for receiving input of a plurality of input video signals and generating an output video signal for each display device in accordance with the layout from the input video signals;
a pattern signal generation unit for generating pattern signals respectively indicating a plurality of different test pattern images;
a selector for receiving input of the output video signals and the pattern signals and selecting and outputting either the output video signals or the pattern signals;
an imaging device for capturing an image of the test pattern images displayed on the respective display devices; and
a control device for analyzing the captured image captured by the imaging device and generating control information for controlling the image processing unit, based on analysis results,
wherein the control device displays a user interface screen on which first objects indicating the respective display devices are displayed, based on the analysis results,
wherein, in accordance with a user's operation, the control device arranges second objects on the user interface screen, the second objects each indicating a video based on a corresponding one of the input video signals, and wherein, based on the arrangement of the second objects, the control device generates second arrangement information indicating an arrangement of the videos based on the corresponding input video signals on the user interface screen.

5. The image display system according to claim 4, wherein the second arrangement information includes information indicating a position, a size, and a rotation angle of each of the second objects on the user interface screen.

6. The image display system according to claim 4, wherein the image processing unit generates the output video signals for the respective display devices, based on relative positional relationships between and sizes of the first objects and the second objects on the user interface screen.

7. The image display system according to claim 4, the system further comprising an image transmission unit for receiving input of the output video signals and the pattern signals from the selector and respectively adding IP addresses to the output video signals and the pattern signals and transmitting the output video signals and the pattern signals, wherein each of the display devices receives, from the image transmission unit, the output video signal and the pattern signal to each of which the corresponding IP address has been added, and displays an image based on the received output video signal and pattern signal each having the IP address in agreement with an IP address of the display device.

* * * * *